(12) United States Patent
Roberts et al.

(10) Patent No.: US 10,042,750 B2
(45) Date of Patent: Aug. 7, 2018

(54) APPARATUSES AND METHODS FOR ADAPTIVE CONTROL OF MEMORY USING AN ADAPTIVE MEMORY CONTROLLER WITH A MEMORY MANAGEMENT HYPERVISOR

(71) Applicant: Micron Technology, Inc., Boise, ID (US)

(72) Inventors: David A. Roberts, Santa Cruz, CA (US); J. Thomas Pawlowski, Boise, ID (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 209 days.

(21) Appl. No.: 13/911,797

(22) Filed: Jun. 6, 2013

(65) Prior Publication Data

US 2014/0281149 A1    Sep. 18, 2014

Related U.S. Application Data

(60) Provisional application No. 61/799,731, filed on Mar. 15, 2013.

(51) Int. Cl.
*G06F 12/00* (2006.01)
*G06F 12/02* (2006.01)
*G06F 13/16* (2006.01)

(52) U.S. Cl.
CPC ........ *G06F 12/023* (2013.01); *G06F 12/0292* (2013.01); *G06F 13/1694* (2013.01); *Y02D 10/13* (2018.01); *Y02D 10/14* (2018.01)

(58) Field of Classification Search
CPC ............... G06F 12/023; G06F 13/1668; G06F 12/0292; G06F 13/1694; Y02D 10/14; Y02D 10/13

(Continued)

(56) References Cited

U.S. PATENT DOCUMENTS 6,556,952 B1 *  4/2003  Magro ................ G06F 11/3409
                                                  702/182
6,754,117 B2   6/2004  Jeddeloh (Continued)

FOREIGN PATENT DOCUMENTS

KR     20110073366 A    6/2011
WO     1993024885 A1    12/1993

(Continued)

OTHER PUBLICATIONS

International Search Report and Written Opinion for PCT/US2014/019396 dated Jun. 30, 2014.

(Continued)

*Primary Examiner* — Hong Kim
(74) *Attorney, Agent, or Firm* — Dorsey & Whitney LLP

(57) ABSTRACT

Apparatuses and methods for adaptive control of memory are disclosed. One example apparatus includes a processing unit configured to run an operating system, and a memory coupled to the processing unit. The memory configured to communicate with the processing unit via a memory bus. The example apparatus may further include an adaptive memory controller configured to receive monitored statistical data from the memory and from the processing unit. The adaptive memory controller is configured to manage the memory based on the monitored statistical data.

27 Claims, 7 Drawing Sheets

(58) Field of Classification Search
USPC .................................. 711/170, 154, 206, 5
See application file for complete search history.

(56) References Cited

U.S. PATENT DOCUMENTS

| | | | |
|---|---|---|---|
| 7,356,665 B2 | 4/2008 | Rawson, III | |
| 7,929,368 B2 | 4/2011 | Jeddeloh | |
| 7,978,721 B2 | 7/2011 | Jeddeloh et al. | |
| 8,018,752 B2 | 9/2011 | Jeddeloh | |
| 8,032,804 B2 | 10/2011 | Jeddeloh | |
| 8,086,913 B2 | 12/2011 | Houg | |
| 8,127,185 B2 | 2/2012 | Jeddeloh | |
| 8,281,074 B2 | 10/2012 | Jeddeloh | |
| 8,327,225 B2 | 12/2012 | Jeddeloh | |
| 8,918,618 B2 | 12/2014 | Fisher et al. | |
| 9,183,057 B2 | 11/2015 | Walker | |
| 2005/0144403 A1 | 6/2005 | Jeddeloh | |
| 2007/0067598 A1* | 3/2007 | Fujimoto | G06F 3/061 |
| | | | 711/170 |
| 2007/0198866 A1 | 8/2007 | Saito | |
| 2009/0070776 A1 | 3/2009 | Dahlstedt | |
| 2009/0187785 A1* | 7/2009 | Gonzalez | G06F 11/106 |
| | | | 714/5.1 |
| 2009/0204746 A1* | 8/2009 | Chen | G06F 12/0246 |
| | | | 711/103 |
| 2009/0248952 A1* | 10/2009 | Radke | G11C 11/5628 |
| | | | 711/100 |
| 2010/0122016 A1* | 5/2010 | Marotta | G06F 12/0246 |
| | | | 711/103 |
| 2010/0174851 A1 | 7/2010 | Leibowitz et al. | |
| 2010/0191999 A1 | 7/2010 | Jeddeloh | |
| 2010/0332922 A1* | 12/2010 | Chang | G06F 12/0246 |
| | | | 714/704 |
| 2011/0019531 A1 | 1/2011 | Kim et al. | |
| 2011/0153908 A1 | 6/2011 | Schaefer et al. | |
| 2011/0302359 A1* | 12/2011 | Schmidberger | G06F 12/0246 |
| | | | 711/103 |
| 2011/0320751 A1 | 12/2011 | Wang et al. | |
| 2012/0017138 A1* | 1/2012 | Erez | G06F 11/1004 |
| | | | 714/773 |
| 2012/0030413 A1* | 2/2012 | Miyagawa | G06F 12/0246 |
| | | | 711/103 |
| 2012/0066473 A1 | 3/2012 | Tremaine et al. | |
| 2012/0102258 A1 | 4/2012 | Hepkin et al. | |
| 2012/0117301 A1 | 5/2012 | Wingard | |
| 2012/0144106 A1* | 6/2012 | Bains | G11C 11/40611 |
| | | | 711/106 |
| 2012/0173827 A1* | 7/2012 | Wood | G11C 11/5621 |
| | | | 711/154 |
| 2012/0185854 A1* | 7/2012 | Dahlstedt | G06F 9/5016 |
| | | | 718/1 |
| 2012/0311274 A1* | 12/2012 | Jacobs | G06F 11/0712 |
| | | | 711/153 |
| 2013/0021846 A1* | 1/2013 | Rao | G11C 16/3495 |
| | | | 365/185.03 |
| 2013/0080730 A1* | 3/2013 | Kim | G06F 12/0246 |
| | | | 711/203 |
| 2013/0170274 A1* | 7/2013 | Yu | G11C 11/4063 |
| | | | 365/51 |
| 2013/0173844 A1* | 7/2013 | Chen | G06F 12/0246 |
| | | | 711/103 |
| 2013/0246734 A1* | 9/2013 | Schaefer | G06F 11/3409 |
| | | | 711/206 |
| 2014/0040576 A1* | 2/2014 | Cordero | G06F 11/2221 |
| | | | 711/162 |
| 2016/0062909 A1 | 3/2016 | Walker | |

FOREIGN PATENT DOCUMENTS

| | | |
|---|---|---|
| WO | 2006012019 A1 | 2/2006 |
| WO | 2008086488 A2 | 7/2008 |
| WO | 2014149538 A1 | 9/2014 |

OTHER PUBLICATIONS

First Office Action received for TW Application No. 103108825 dated Sep. 8, 2015.
Extended European Search Report for EP Appl. 14769197.6 dated Dec. 8, 2016; pp. all.
First Office Action for CN Application No. 201480015708.2 dated Mar. 20, 2017.
"AMD-V Nested Paging", in white paper http://developer.amd.com/assets/NPT-WP-1%201-final-TM.pdf, Jul. 2008, 19 pgs.
Notice of Preliminary Rejection dated Jun. 21, 2017 for Korean application No. 10-2015-7028597.
Bojnordi, et al., "Paris: A Programmable Memory Controller for the DDRx Interfacing Standards", IEEE, Apr. 2012, 12 pgs.
Deng, et al., "MemScale: Active Low-power Modes for Main Memory", ASPLOS, Mar. 2011, 14 pgs.
Phadke, et al., "MLP Aware Heterogeneous Memory System", Proceedings in Design, Automation & Test in Europe, Mar. 2011, 7 pgs.
Qureshi, et al., "Morphable Memory System: A Robust Architecture for Exploiting Multi-Level Phase Change Memories", ISCA, Jun. 2010, 10 pgs.
Salapura, et al., "Next-Generation Performance Counters: Towards Monitoring Over Thousand Concurrent Events", IEEE (ISPASS), Apr. 2008, 10 pgs.
Zheng, et al., "Mini-Rank: Adaptive DRAM Architecture for Improving Memory Power Efficiency", IEEE, Nov. 2008, 13 pgs.
Second Office Action for CN Application No. 201480015708.2 dated Sep. 22, 2017.
Notice of Preliminary Rejection dated Dec. 27, 2017 for Korean application No. 10-2015-7028597.

* cited by examiner

APPARATUSES AND METHODS FOR ADAPTIVE CONTROL OF MEMORY USING AN ADAPTIVE MEMORY CONTROLLER WITH A MEMORY MANAGEMENT HYPERVISOR

CROSS REFERENCE TO RELATED APPLICATION(S)

This application claims priority to Provisional Application No. 61/799,731, filed Mar. 15, 2013, which application is incorporated herein by reference, in its entirety, for any purpose.

TECHNICAL FIELD

Embodiments of the disclosure relate generally to memory, and more particularly, in one or more of the illustrated embodiments, to control of memory using an adaptive memory controller.

BACKGROUND OF THE DISCLOSURE

Emerging memory architectures are designed to handle a range of different request sizes and may include memories with different characteristics. For example, there have been several proposals for memory composed of dynamic random-access memory (DRAM) and phase-change memory (PCM) or multiple types of DRAM chips (e.g. double data rate (DDR), low power DDR (LPDDR), reduced-latency DRAM (RLDRAM)). Furthermore, some computer systems may support non-uniform memory access (NUMA), where information is placed according to the performance of available memory. Memories can also have their characteristics altered dynamically, even when composed of the same types of memories e.g. NAND flash memory. For example, multi-channel memories and dynamic DRAM frequency switching alter the characteristics of the memory. Non-volatile memory characteristics can also be highly non-uniform, where certain NAND flash pages are faster to read or write than others, with latencies changing as they wear out, or with different levels of multi-level-cells (MLC) within or between different flash memories.

Other examples of dynamic memory re-configuration include dynamic placement of information in a computer system on memories with different fixed or configurable characteristics. For example, requests from highly serial or write-dominated algorithms can be directed towards high-latency volatile memories, while requests from parallel algorithms can be served from lower latency or non-volatile memories. In other examples, requests from highly serial or write-dominated algorithms may also be directed towards low-latency memories, while requests from parallel algorithms may be served from higher-latency. Selection a memory allocation of information related to an algorithm based on characteristics of the algorithm may enable an effective cost-performance-energy trade-off in the memory system design.

Conventional proposals for control and coordination of these disparate adaptive mechanisms is to incorporate memory management as part of standard operating system software, with access to a limited set of accessible hardware performance counters to guide memory configuration decisions. With the move towards abstracted memory and hardware, which offloads memory control to the memory itself, standardized software interfaces will be insufficient. In particular, abstracted memories are capable of exploiting memory variations and self-tuning to maximize performance, while current software is unaware of these capabilities. The memory control system benefits from knowledge of host processor state, but there exists no mechanism to feed the memory control logic with appropriate statistics.

DETAILED DESCRIPTION

Certain details are set forth below to provide a sufficient understanding of embodiments of the disclosure. However, it will be clear to one skilled in the art that embodiments of the disclosure may be practiced without these particular details. Moreover, the particular embodiments of apparatuses and methods described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

Figure 1:
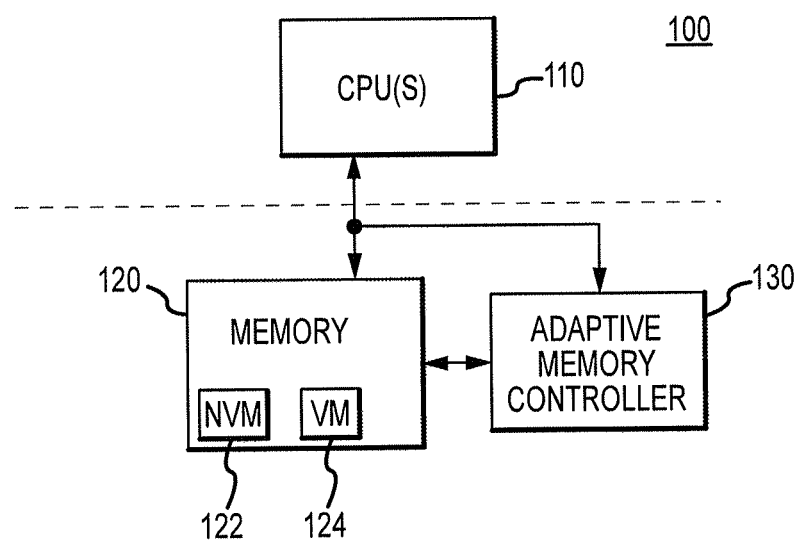
FIG. 1 is a block diagram of an apparatus including an adaptive memory controller according to an embodiment of the disclosure.

FIG. 1 illustrates an apparatus including an adaptive memory controller according to an embodiment of the disclosure. The apparatus 100 may include a central processing unit 110 coupled to a memory 120 and an adaptive memory controller 130. The central processing unit 110 may be coupled to the memory 120 via a memory bus. The central processing unit 110 may include multiple host processing units. In some embodiments, the multiple host processing units may be on a single chip. In other embodiments, the central processing unit 110 may be spread across multiple chips and communicate via a network. Each processing unit of the central processing unit 110 may have an associated cache. In some embodiments, the caches of the central processing unit 110 may be cache coherent, (e.g., all caches are consistent with each other). The memory 120 may be configured to store and provide information (e.g., data and instructions) responsive to requests received from the central processing unit 110 and/or the adaptive memory controller 130. The memory 120 may include a non-volatile memory 122 and/or a volatile memory 124. In some embodiments, the non-volatile memory 122 and/or the volatile memory 124 are multi-channel memories. The non-volatile memory 122 may include flash memory (e.g., NAND and/or NOR), PCM, and/or other non-volatile memories. The volatile memory 124 may include DRAM, SRAM, and/or other volatile memories.

The adaptive memory controller 130 may be configured to monitor and manage the memory 120 based on monitored statistical data (e.g., counters, timing, processing tendencies) of the central processing unit 110 and the memory 120. For example, the adaptive memory controller 130 may be configured to dynamically map and migrate memory blocks at the memory 120 and/or reconfigure settings associated with the memory 120 based on the monitored statistical data. The monitored statistical data of the memory 120 may include depth map setting of information stored at the memory 120, information mapping of and between the non-volatile memory 122 and the volatile memory 124, frequency of accesses of the non-volatile memory 122 and/or the volatile memory 124, or any combination thereof. The monitored statistical data of the central processing unit 110 may include types of memory accesses, frequency of memory accesses, idle time of processing units of the central processing unit 110, or any combination thereof.

In operation, the apparatus 100 may be configured to run an operating system (OS). The operating system may be run on one or more processing units of the central processing unit 110, with information (e.g., data and instructions) stored at the memory 120. In some embodiments, the operating system may be at least partially executed at a processing unit of the adaptive memory controller 130. The central processing unit 110 may be configured to provide memory access requests to the memory 120 over the memory bus during operation. The memory 120 may process memory access requests to store and/or retrieve information based on the memory access requests. The central processing unit 110 and/or the adaptive memory controller 130 may be configured to monitor statistical data associated with the central processing unit 110 and/or the memory 120. Based on the monitored statistical data, the adaptive memory controller 130 may be configured to manage configuration of the information stored in the memory 120, as well as manage configuration settings of the memory 120. For example, the adaptive memory controller 130 may be configured to map and migrate memory blocks of the memory 120. As will be described further with reference to FIG. 2, the operating system may provide memory management threads (MMT) that monitor the statistical data associated with the central processing unit 110 and the memory 120. The adaptive memory controller 130 managing the configuration of the memory 120 may improve efficiency of the apparatus 100. For example, the adaptive memory controller 130 may map storage of information at the memory 120 in a way that reduces retrieval latency for a software application running on the apparatus 100 that is requesting the information. In another embodiment, the adaptive memory controller 130 may map storage of information at the memory 120 in a way that reduces power consumption during retrieval for a software application running on the apparatus 100 that is requesting the information.

Figure 2:
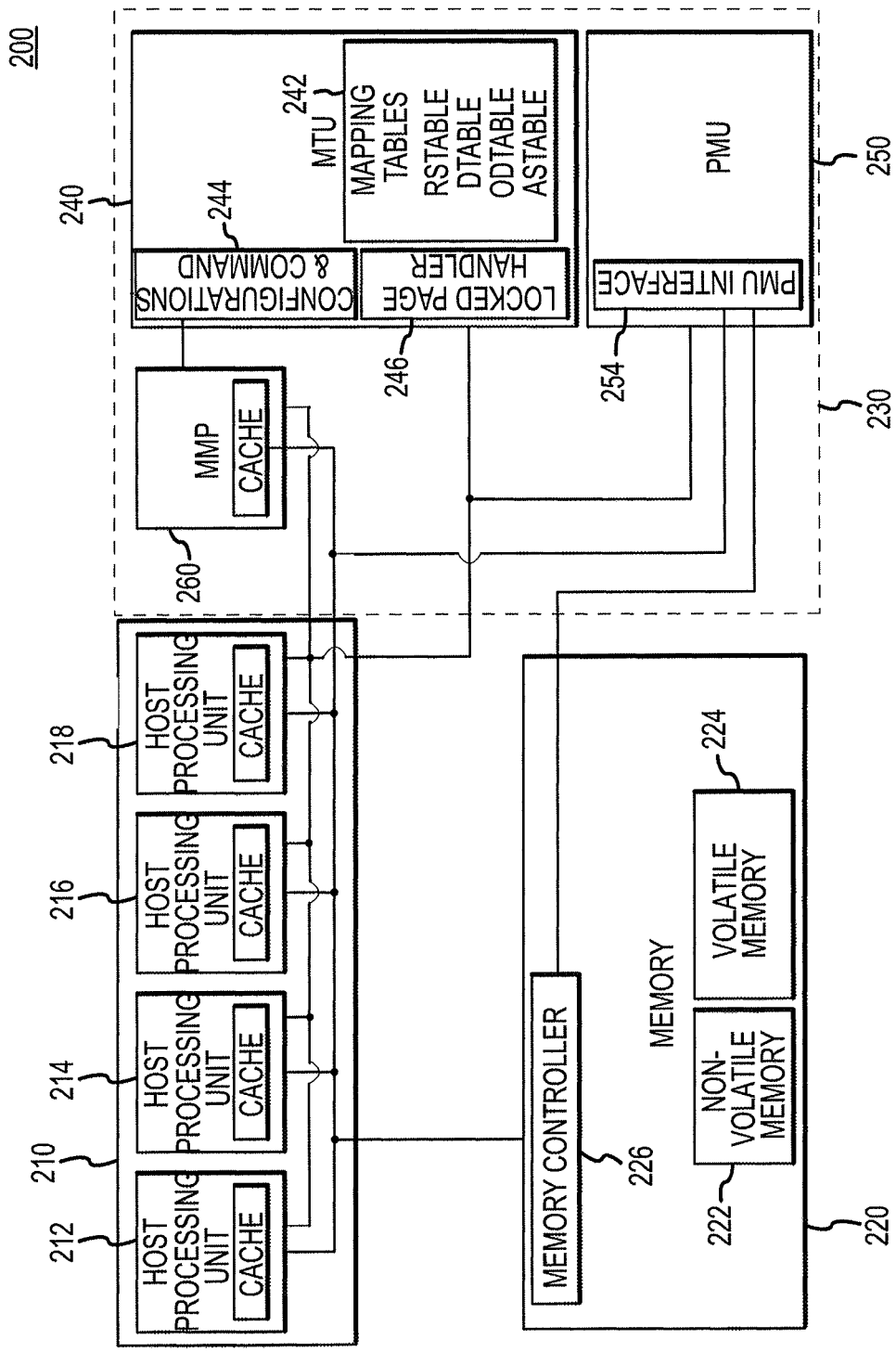
FIG. 2 a block diagram of an apparatus including an adaptive memory controller according to an embodiment of the disclosure.

FIG. 2 illustrates an apparatus 200 including an adaptive memory controller according to an embodiment of the disclosure. The apparatus 200 may include a central processing unit 210 coupled to a memory 220 and an adaptive memory controller 230. The adaptive memory controller 230 may be configured to manage configuration of the memory 220 and to manage and migrate information stored at the memory 220 based on monitored statistical data of the central processing unit 210 and the memory 220. The adaptive memory controller 230 configured to manage and migrate information stored at the memory 220 based on monitored statistical data may serve to improve efficiency (e.g., power and latency) of the apparatus 200 by managing information depth and location based on traffic between the central processing unit 210 (and/or the adaptive memory controller 230) and the memory 220. The central processing unit 210, the memory 220, and the adaptive memory controller 230 may correspond to the central processing unit 110, the memory 120, and the adaptive memory controller 130, respectively, of FIG. 1.

The central processing unit 210 may be configured to communicate with the memory 220 via a memory bus. The central processing unit 210 may include host processing units 212, 214, 216, and 218 that are interconnected. Each of the host processing units 212, 214, 216, and 218 may include an associated cache. The host processing units 212, 214, 216, and 218 may reside on a single chip or may reside on multiple chips or computer systems. In some embodiments, the host processing units 212, 214, 216, and 218 may be cache coherent (e.g., all caches are consistent with each other), which is maintained via a common bus. In other embodiments, the host processing units 212, 214, 216, and 218 may be interconnected by an alternative type of network (e.g. a network-on-chip (NoC)) on the single chip or across multiple chips or computer systems.

The memory 220 may be configured to store and provide information (e.g., data and instructions) based on requests received from the central processing unit 210 and/or the adaptive memory controller 230. The memory 220 may include a memory controller 226 configured to communicate with the host processing units 212, 214, 216, and 218 of the central processing unit 210 via a memory bus. For example, the memory 220 may include a memory controller 226 configured to receive information from and/or provide information to the host processing units 212, 214, 216, and 218 of the central processing unit 210 via a memory bus. The memory 220 may further include a non-volatile memory 222 and/or a volatile memory 224. The non-volatile memory 222 and/or the volatile memory 224 may be configured to store the information received from and/or provided to the host processing units 212, 214, 216, and 218 based on commands received from the memory controller 226. The volatile memory 224 may include DRAM, SRAM, and/or other volatile memories. The volatile memory 224 may be flash memory (e.g., NAND and/or NOR), PCM, and/or other non-volatile memories. In some embodiments, the memory may have additional memory controllers. For example, the non-volatile memory 222 and the volatile memory may have separate memory controllers. Additionally, in some embodiments, each type of memory have a separate memory controller. For example, DRAM and SRAM may have separate memory controllers and/or NAND flash, NOR flash, and/or PCM may have separate memory controllers. In the interest of clarity in describing the apparatus 200, the memory controller 226 may refer to one or more memory controllers of the memory 220.

In some embodiments, the non-volatile memory 222 and/or the volatile memory 224 may include a multi-channel configuration for accessing information. In a multi-channel configuration, a single block of information can either be deep (written as a long sequence across few channels) or shallow (written as a short sequence across many channels). Shallow configurations may trade off higher power consumption for lower latency per transaction, while deep configurations may trade off higher latency for higher concurrency and lower power consumption per transaction.

The adaptive memory controller 230 may be configured to monitor and manage the memory 220 based on statistical data (e.g., counters, timing, configurations, processing tendencies) of the central processing unit 210 and the memory 220. The adaptive memory controller 230 may include a memory management processor MMP 260, a performance monitoring unit PMU 250, and a memory translation unit MTU 240. The PMU 250 may be configured to monitor the statistical data. The performance monitoring unit PMU 250 may include a PMU interface 254. The PMU 250 may be configured to communicate with the memory controller 226, the MMP 260, and/or one or more of the host processing units 212, 214, 216, and 218 to monitor the statistical data via the PMU interface 254. In some embodiments, the PMU interface 254 is configured to communicate with the MMP 260 and the host processing units 212, 214, 216, and 218 via the common bus, etc. Further the PMU interface 254 may be configured to communicate with the memory controller 226 of the memory 220 via at least one of the memory bus or a direct connection to the memory controller 226. The PMU 250 may be configured to monitor the statistical data received from the memory controller 226, the MMP 260, and/or one or more of the host processing units 212, 214, 216, and 218.

The MMP 260 may be configured to run memory management threads (MMTs) to manage the memory 220. For example, the MMP 260 may be configured to runMMTs to determine when and/or how to reconfigure the memory 220 based on monitored statistical data from the PMU 250. The MMP 260 may include a cache, and, in some embodiments, may be cache coherent with the host processing units 212, 214, 216, and 218, which is maintained via the common bus. The MMP 260 may be configured to provide commands to the MTU 240 to initiate or manage migration (e.g., remapping) of memory blocks of the memory 220 and/or reconfigure configurable aspects of the memory 220. The MMP 260 may also be configured to provide memory access requests to the memory 220.

The MTU 240 may be configured to communicate with the memory controller 226, the MMP 260, and/or one or more of the host processing units 212, 214, 216, and 218 in order to perform various functions. Example functions performed by the MTU 240 may include address translation, managing information migration, managing associated translation tables, supporting the intermediate information depth map, or any combination thereof. To support these functions, the MTU 240 may be configured to update and maintain mapping tables 242 and a configurations and command information unit 244 based on commands received from the MMP 260. The mapping tables 242 may include a region/sub-region Table (RSTable), depth table (DTable), old depth table (ODTable), and an address scramble table (ASTable). The configurations and command information unit 244 may be configured to maintain and update configurations of the memory 220 (e.g., volatile memory 224 frequency, refresh periods, the non-volatile memory 222 multi-level cell (MLC) mode, change the volatile memory 224 channel address mapping (channel depth), etc.). The MTU 240 may further include a locked page handler 246 configured to provide an indication of a locked page during a block migration in the memory 220 to a host processing unit 212, 214, 216, and 218 making a request for information stored in a locked page.

In operation, the apparatus 200 may be configured to run an operating system. The operating system may be run at the host processing units 212, 214, 216, and 218 of the central processing unit 210, during which information (e.g., data and instructions) stored at the memory 220 may be accessed. Typically, an operating system is a collection of software that manages computer hardware and provides common services for computer programs (e.g., software applications). That is, an operating system includes basic functions that interface with the hardware (e.g., the central processing unit 210, the memory 220, and the adaptive memory controller 230) and computer programs (e.g., software applications). In accessing information (e.g., data and instructions) stored at the memory 220, the host processing units 212, 214, 216, and 218 may send memory access requests that include logical addresses logically identifying locations to be accessed. In accessing the non-volatile memory 222 and/or the volatile memory 224, an address map is used to translate from the logical address to a physical address of the memory 220. In some embodiments, the operating system may be a memory management hypervisor (MMH) (e.g., a virtual machine manager) operating system configured to support guest operating systems run on one or more of the host processing units 212, 214, 216, and 218. Examples of guest operating systems may include server operating systems (e.g., Microsoft® Windows® Server, Microsoft® Windows® Home Server, Microsoft® Windows® Multipoint Server, Microsoft® Windows® Small Business Server, Linux® CentOS, Linux® Red Hat Enterprise, SUSE Enterprise Server, etc., including other server operating systems), client operating systems (e.g., Microsoft® Windows® 2000, XP, Vista, 7, 8, etc., Apple® Mac OS, Berkeley Software Distribution (BSD) FreeBST, NetBSD, OpenBSD, etc., etc., including other client operating systems), and any other type of operating system. The MMH operating system may be a software layer responsible for controlling hardware of the central processing unit 210, the memory 220, and the adaptive memory controller 230.

In the apparatus 100, the host processing units 212, 214, 216, and 218 may be configured to run multiple application threads at a given time, where a given application thread that may include different phases with different logical address patterns. The adaptive memory controller 230 may be configured to perform dynamic reconfiguration of the memory 220 to match an information mapping with changing memory patterns of threads running on the host processing units 212, 214, 216, and 218.

In order to support performance of dynamic reconfiguration of the memory 220 by the adaptive memory controller 230, the MMH operating system may include functionality that is at least partially run on the MMP 260 to, for example, offload memory management tasks from the host processing units 212, 214, 216, and 218. For example, the MMH operating system may provide the MMTs that are configured to manage the MTU 240 and/or the memory 220. The MMH operating system may assign execution of the MMTs to the MMP 260. To support the MMTs, the MMP 260 may include hardware units to increase efficiency of memory management tasks associated with the MMTs. Examples of hardware units may include statistics monitoring units, direct memory access (DMA) engines/units, error correcting code (ECC) encoders/decoders, etc. The MMP 260 running the MMTs may be operable to configure the memory 220, either directly or via the MTU 240; to offload memory managements tasks from the host processing units 212, 214, 216, and 218; to initialize and update mapping on the MTU 240; and to modify (or request modification of) system page tables.

For example, the MMP 260 running the MMTs may be configured to determine when and how to reconfigure the memory 220 based on monitored statistical data received from the PMU 250. Examples of reconfiguration of the memory 220 may include performing memory scrubbing for fault-tolerance, changing the volatile memory 224 frequency, changing refresh periods, changing the non-volatile memory 222 MLC mode, changing the volatile memory 224 channel address mapping (channel depth), etc. Further, as explained above, the adaptive memory controller 230 may be configured to perform dynamic reconfiguration of the memory 220 to match an information mapping with changing memory patterns of threads running on the host processing units 212, 214, 216, and 218. However, changing the information mapping may result in the physical movement of large amounts of information, which can consume valuable bandwidth and energy, reducing performance. Thus, the MMP 260 running the MMTs may be configured to map information using an intermediate information depth map. The intermediate information depth map will be described further with reference to FIGS. 4-9.

The PMU 250 may have privileged access to statistics provided by the memory controller 226 and the host processing units 212, 214, 216, and 218, including microarchitectural performance counters to monitor the statistical data that is provided to the MMP 260 running the MMTs. In some embodiments, the PMU 250 may have an optional direct connection with the memory controller 226 rather than monitoring statistical data via the common bus. Examples of monitored statistical data provided by the PMU 250 to the MMP 260 may include a state of any on-chip structures (e.g., load/store queues), reorder buffer (ROB), and the memory controller 226 queues, some of which may not be accessible to a typical operating system. The availability of these statistics via the PMU 250 may help guide memory decisions by the MMTs.

Additionally and/or alternatively, the MMP 260 running the MMTs may also be configured to communicate with the MTU 240 via the configurations and command information unit 244 to control configuration of the memory 220 address mappings and policies. For example, based on the monitored statistical data received from the PMU 250, the MMP 260 running the MMTs may also be configured to initialize and update mapping and configuration states of the memory 220 that are maintained at the configurations and command information unit 244 of the MTU 240. As explained above, the MTU 240 may be configured to perform various functions, including address translation, manage information migration and manage associated translation tables, support the intermediate information depth map, or any combination thereof. The MTU 240 may be configured to perform these functions responsive to commands received from the MMP 260 running the MMTs, including supporting the intermediate information depth map, etc.

To support the functionality of the MTU 240 and the MMP 260 running the MMTs, the apparatus 200 may include augmented page tables and translation-lookaside-buffers (TLBs) for processing memory access requests. For example, the augmented tables and TLBs may contain additional metadata that indicates address map settings and memory configurations. The augmented tables and TLBs may be maintained by the memory controller 226 and/or the MTU 240. Examples of the metadata in the augmented tables includes an indication of a migration operation, an ECC type, strength and ECC bit distribution, depth mapping mode of the non-volatile memory 222 and/or the volatile memory 224, support bits for an intermediate information depth map for multi-channel memory (e.g., the non-volatile memory 222 and/or the volatile memory 224), memory channel configuration and frequency (e.g., stored in the configurations and command information unit 244), and/or other dynamically controllable memory mapping or hardware configuration settings. In some embodiments, the augmented tables and TLBs may be invisible to guest operating system(s) and only implemented in shadow page tables of the MMH operating system. In other embodiments, the augmented tables and TLBs may be transparent and available to both the MMH operating system and guest operating system(s).

The MTU 240 may be configured to manage and/or use at least some of the metadata in the augmented tables and TLBs to assign address translation, manage information migration, and manage associated translation tables. As explained above, the MTU 240 may be configured to receive memory access requests from any of the host processing units 212, 214, 216, and 218 and/or the MMP 260. In some cases, the memory access request may correspond to a page undergoing a migration operation (e.g., an in-flight page). The MTU 240 may be configured to handle an access to an in-flight page and read or modify blocks of the in-flight page during the migration operation. For example, while a page of the non-volatile memory 222 and/or the volatile memory 224 is undergoing a migration operation, the MMP 260 and/or the MTU 240 may be configured to set a "migrate" bit in the augmented TLB to indicate the migration status. Further, the MTU 240 may be configured to update the mapping tables 242 during the migration operation.

Responsive to receiving a memory access to the inflight page, the MTU 240 may respond in one or more ways. A first example response may include, responsive to a memory access to the in-flight page (e.g., as indicated by the "migrate" bit), the locked page handler 246 of the MTU 240 generating a page fault in the MMH operating system. Responsive to the page fault, completion of the memory request is deferred to the MMH operating system. The MMH operating system (or guest operating system) may terminate the thread making the request or stall the thread making the request until the migration operation is complete. A second example response may include, responsive to a memory access to an in-flight page (e.g., as indicated by the "migrate" bit), the locked page handler of the MTU 240 transparently translating the logical address associated with the memory access request based on information of the mapping tables 242, and provide the translated logical address to the TLB for translation to a physical address storing the information associated with the memory access request. Handling of memory accesses to in-flight pages facilitates information access operations on pages that have not completed an entire migration operation.

The preceding description describes an exemplary embodiment of the apparatus 200. It is appreciated that the apparatus 200 may be modified to include other embodiments. For example, the apparatus 100 may include a single operating system, and the MMH operating system functionality supporting the described memory management (e.g., including the MMTs) may be included in the single operating system. In some embodiments, the apparatus 100 may not include the MMP 260, and the memory management functionality described may be run on the host processing units 212, 214, 216, and 218. In other embodiments, the MMP 260 may be on a same chip as the host processing units 212, 214, 216, and 218.

Further, in some embodiments, the MMTs may be run on one or more of the host processing units 212, 214, 216, and 218, in addition to or rather than running on the MMP 260. The MMP 260 may also be configured to run guest operating systems and/or threads of the MMH operating system other than or in addition to the MMTs. In some embodiments, the MMP 260 may support a superset of the instruction set (ISA) supported by the host processing units 212, 214, 216, and 218, which may simplify the MMH operating system's task of thread scheduling, as well as simplify hardware cache coherence. In some embodiments, the MMP 260 may include additional hardware that performs multi-level ECC encoding/decoding, including using proprietary algorithms. Rather than sharing a memory bus with the host processing units 212, 214, 216, and 218, the MMP 260 may be coupled to the memory controller 226 via a direct connection. In some embodiments, all or a portion of the MTU 240 may be included in the memory 220. For example, the mapping tables 242 in the MTU 240 may be stored in cache memories, and the mapping tables 242 may be included in the memory 220. In addition, the migration of blocks of the non-volatile memory 222 and the volatile memory 224 may be performed by the MMP 260, the MTU 240, or a combination of each.

The apparatus 200 having the adaptive memory controller 230 may reduce mode change bandwidth (e.g., power conservation mode versus performance mode), which may cause migration blocks of the memory 220, and may increase performance and reduce latency, while also reducing power consumption. The MMP 260 running the MMTs of the MMH operating system may be able to make better mapping decisions due to access to micro-architectural information and the current workload of the memory 220 via the PMU 250.

Figure 3:
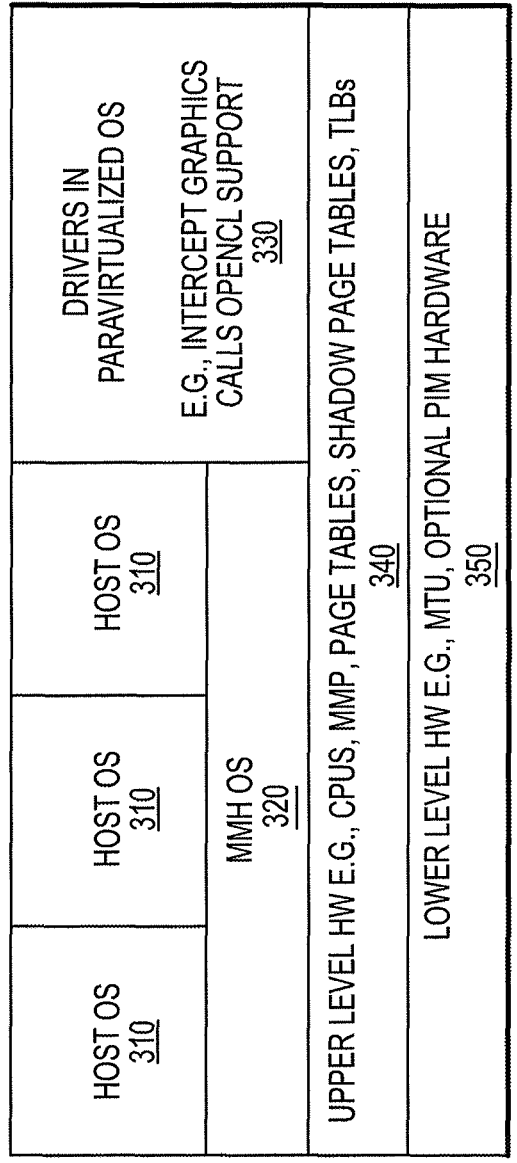
FIG. 3 a block diagram of an hardware/software stack including a memory management hypervisor according to an embodiment of the disclosure.

FIG. 3 illustrates a block diagram including a software/hardware hierarchy having a memory management hypervisor operating system (MMH OS) according to an embodiment of the disclosure. The block diagram 300 may include hardware components, including lower level hardware (e.g., memory translation unit MTU and other processor-in-memory PIM hardware) 350 and upper level hardware and supporting information (e.g., CPUs, MMP, page tables, shadow page tables, TLBs) 340, and software components, including drivers in paravirtualized OS (e.g., intercept graphics calls, OpenCL support) 330, MMH OS 320, and host OS (e.g., guest operating system, such as a server operating system, a client operating system, or another type of operating system) 310. The MMH OS 320 may correspond to the operating system described with reference to FIG. 1 and/or the MMH operating system described with reference to FIG. 2. The upper level hardware and supporting information 340 may correspond to hardware components of the central processing unit 110 and/or the adaptive memory controller 130 of FIG. 1, and/or the central processing unit 210, the MMP 260, and/or the PMU 250 of FIG. 2. The lower level hardware 350 may correspond to a portion of the adaptive memory controller 130 of FIG. 1 and/or the MTU 240 of FIG. 2. Operation of the upper level hardware and supporting information 340 and the lower level hardware 350 was described with reference to FIG. 2, and, for brevity, will not be repeated for FIG. 3. The drivers in paravirtualized OS 330 may be an operating system configured to support drivers associated with hardware of a computing system, such as the lower level hardware 350. For example, the drivers in paravirtualized OS 330 may be configured to handle graphics related commands and support open computing language for other processor types (e.g., graphics processing units, digital signal processors, etc.)

The MMH OS 320 may include operating system software having a high privilege level that makes the MMH OS 320 capable of performing low-level system operations. In some embodiments, the operating system may be a virtual machine manager operating system configured to support the host OS 310, which may be run on one or more of the CPUs and/or MMP of the upper level hardware and supporting information 340. Thus, the MMH OS 320 may be a software layer responsible for controlling hardware of the upper level hardware and supporting information 340 and the lower level hardware 350. For example, the MMH OS 320 may be configured to perform requests on behalf of host OS 310, which are running at a lower privilege level than the MMH OS 320. The requests from the host OS 310 may typically be directed to gain access to shared resources such as input/output (I/O) devices and memory space, such as the memory 120 of FIG. 1 and/or the memory 220 of FIG. 1.

As described with reference to FIG. 2, the MMH OS 320 may be configured to provide memory management threads (MMT), which, in some embodiments, may be executed on an MMP of the upper level hardware and supporting information 340. Additionally, the MMH OS 320 may also be configured to make reconfiguration decisions based on monitored statistical data (e.g., received from the PMU 250 of FIG. 2) and initiate the reconfiguration decisions on the MMP of the upper level hardware and supporting information 340. In some embodiments, the MMP of the upper level hardware and supporting information 340 may have faster and more access to the monitored statistical data than other CPUs of the lower level hardware 350 by physically placing the PMU closer to the MMP or providing the PMU with a dedicated bus to the MMP (and hence the MMTs of the MMH OS 320).

Additionally, the MMH OS 320 may have modified memory management code configured to configure and control the MMP and handle requests to in-flight pages, e.g., pages that are currently owned by the MMP and are undergoing migration or other operations. In some embodiments, handling of requests to in-flight pages may be handled using standard page locking mechanisms initiated by the MMTs of the MMH OS 320. Alternatively, the handling of requests to in-flight pages may be handled by a special page fault handler, such as the locked page handler 246 of FIG. 2, which treats memory accesses to locked pages as memory stalls.

In some embodiments, the MMH OS 320 may be configured to encode the MMTs in encrypted form. This, for example, could represent a manufacturer's device-specific characterization of the memory subsystem, such as a map of refresh rates with temperature. The MMH OS 320 may be configured to decrypt the MMT code and data prior to running the MMTs. In another embodiment, the MMTs may be written in an intermediate language (e.g., a virtual machine instruction set) and translated into MMT instructions in software to allow cross-platform compatibility.

Figure 4:
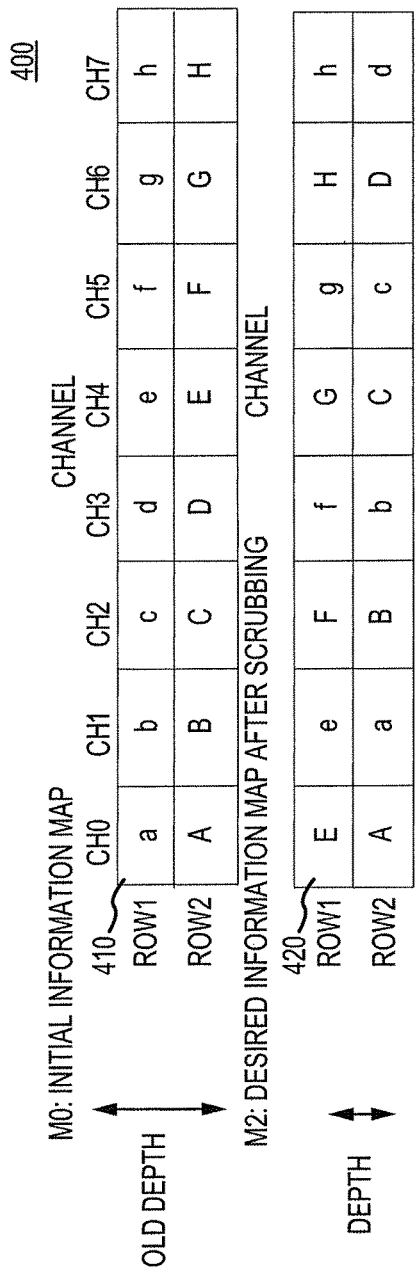
FIGS. 4-6 are exemplary block diagrams of an intermediate information depth mapping according to an embodiment of the disclosure.
Figure 5:
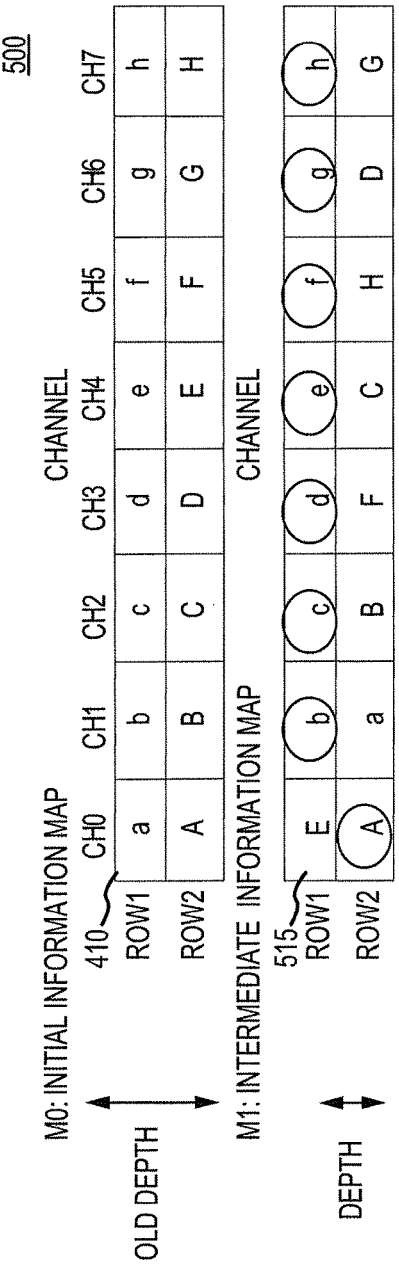
Figure 6:
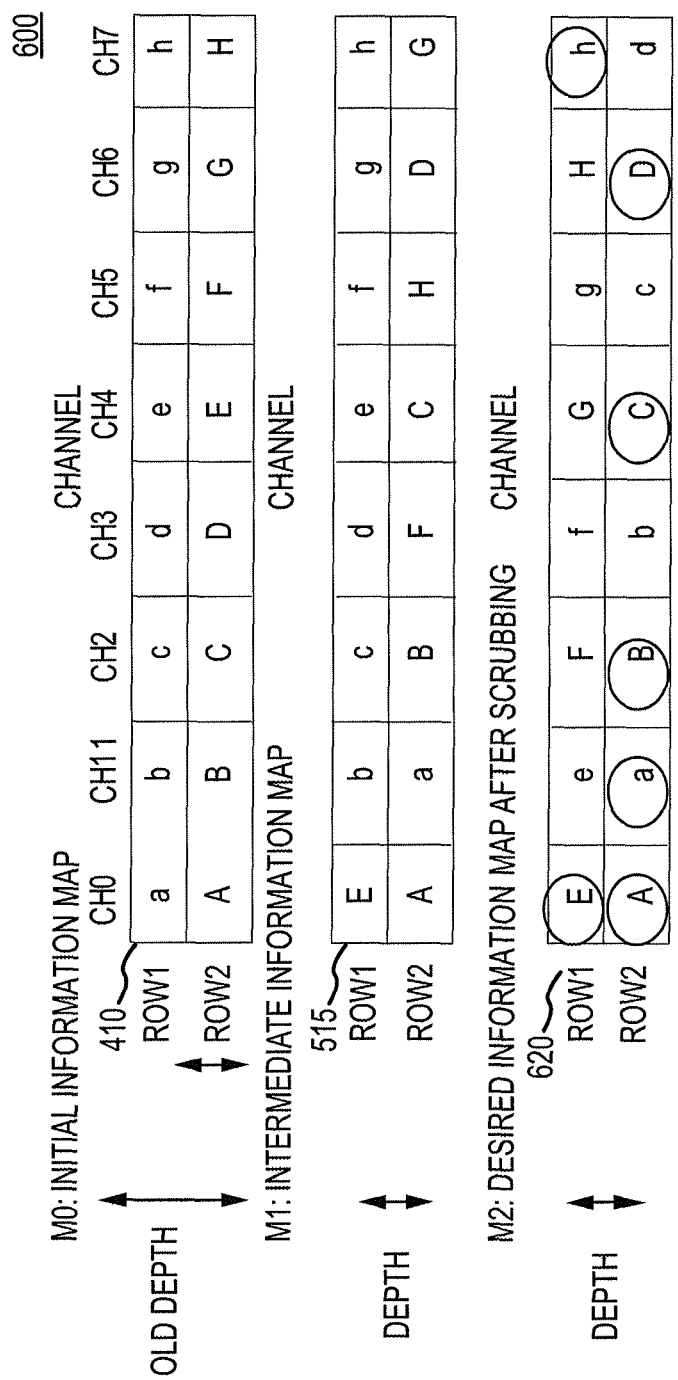

Referring to FIGS. 4-6, an information depth map of a memory relates to an organization of the information in the memory. Each depth map may have benefits and costs as compared with other information depth maps. For example, a first information depth map stored at the memory may provide lower information access latency than a second information depth map, but may use more power than the second information depth map. Information depth map needs may change as needs of a computing system change. In some embodiments, one information depth map stored at a memory may be most advantageous for a particular computer program, while a different information depth map stored at the memory may be more advantageous for another computer program. For example, a computer program performing computations that is continuously accessing operands may prefer the first information depth map with lower latency, while a computer program consuming a stream of continuous data may not be as dependent on latency, and may be more efficient to use the second information depth map. Further, one information depth map may provide advantages based on a mode of the computing system (e.g., the apparatus 100 of FIG. 1 and/or the apparatus 200 of FIG. 2). Thus, a computing system in a performance mode may select the first information depth map to optimize information access latency, while a computer system in a power conservation mode (e.g., on battery power) may select the second information depth map to optimize power consumption. Transitioning from one information depth map to another information depth map may require migration of a substantial amount of information, which may consume additional power and other resources, such as preventing access to affected regions of memory during the migration. Thus, an intermediate information depth map stored at the memory may be implemented to achieve benefits of a desired information depth map, but may reduce migration of information as compared with completely moving to a desired information depth map.

FIGS. 4-6 illustrate block diagrams depicting exemplary embodiments of intermediate information depth mapping to an embodiment of the disclosure. Intermediate depth mapping may be performed by the adaptive memory controller 130 of FIG. 1 and/or the adaptive memory controller 230 of FIG. 2. FIGS. 4-6 depict tables 410, 420, 515, and 620. Each uppercase letter and each lower case letter in the tables 410, 420, 515, and 620 represent an information (e.g., data and/or instructions) unit of X bytes. A common uppercase letter and a corresponding lower case letter (e.g., "A" and "a", "B" and "b", . . . "H", and "h") in the 410, 420, 515, and 620 represent a respective total information unit that is to be consumed by a host processing unit. The tables 410, 420, 515, and 620 are divided into rows ROW1 and ROW2 and channels CH0-CH7. Each row of the tables 410, 420, 515, and 620 may represent a contiguous block of information stored in sequential physical memory locations in channel CH0-7. For example, "A" is in CH0 of ROW1 and "a" is in CH0 of ROW2 may be consecutive storage locations associated with CH1. Similarly, "B" is in CH1 of ROW1 and "b" is in CH1 of ROW2 may be consecutive storage locations associated with CH2. In this particular example, each channel may be capable of providing X bytes of information in parallel for a total of 8X bytes of information. In the interest of clarity in describing the operation of the intermediate depth mapping, the following description will assume that all storage locations identified by the rows ROW1 and ROW2 storing the data units are of a fixed size X. It will be appreciated the size of a storage location identified by the rows ROW1 and ROW2 for each channel CH0-CH7 may be configurable and may vary from one channel to another.

FIG. 4 depicts a complete migration from an initial information map M0 table 410 to a desired information map M2 table 420 after scrubbing. The initial information map M0 table 410 is a sequential information map that has a 2X bytes depth represented by the OLD DEPTH arrow. Thus, each of the total information units may be 2X bytes deep, and, thus, would require two sequential memory accesses to retrieve a total information unit from a single memory channel (e.g., first memory access directed to ROW1 to retrieve "A" from CH0 and a second memory access directed to ROW2 to retrieve "a" from CH0). The sequential information mapping of the initial information map M0 table 410 may result in higher latency, as two memory accesses are needed to retrieve a total information unit of a channel, for example, "A" and "a" from CH0.

The desired information map M2 table 420 depicts a parallel information map that has an X bytes depth represented by the DEPTH arrow. Relative to the initial information map M0, the depth is decreased from a 2X byte depth to an X byte depth. Thus, since each part of a total information unit resides in a different channel, each of the total information units may be X bytes deep, and thus, could be accessed via one memory access (e.g., a memory access retrieving ROW1). The parallel information mapping of the desired information map M2 table 420 may take less time to retrieve a total information unit, as retrieval may be accomplished by one memory access.

In order to migrate directly from the initial information map M0 table 410 to the desired information map M2 table 420, individual information units of a total information unit may be migrated to different channels. A brute force method may require 16 moves to move every information unit to a different location. As an alternative to the brute force method, the information units "A" and "h" are in the same location in both of tables 410 and 420, thus may not be migrated. Therefore, the migration from the initial information map M0 table 410 to the desired information map after scrubbing M2 table 420 may be reduced to 14 information unit moves by keeping information units "A" and "h" in the current position.

In some circumstances, a computing system may not have sufficient time to perform a complete migration, or the computing system may be in a power conservation mode such that a complete migration is impractical. Thus, FIG. 5 depicts an intermediate information map M1 table 515 that may achieve some of the benefits of an X byte depth depicted in the desired information map M2 table 420, without completely migrating the information units as depicted in the desired information map M2 table 420. FIG. 5 includes elements that have been previously described with respect to the FIG. 4. Those elements have been shown in FIG. 5 using the same reference numbers and labels as in FIG. 4, and the common elements are as previously described. Consequently, a detailed description of these elements will not be repeated in the interest of brevity.

FIG. 5 depicts migration from the initial information map M0 table 410 to an intermediate information map M1 table 515. As explained, the initial information map M0 table 410 may correspond to the initial information map M0 table 410 of FIG. 4 having the 2X byte depth sequential information mapping. The intermediate information map M1 table 515 represents a parallel information map having the X bytes depth that is similar to the desired information map after scrubbing M2 table 420 of FIG. 4, but without moving all of the information units to new locations. For example, the circled letters (e.g., "A", "b", "c", "d", "e", "f", "g", and "h") are able to remain stored as depicted in the initial information map M0 table 410. Migrating from the initial information map M0 table 410 to the intermediate information map M1 table 515 may require relocating 8 information units across the memory to different locations that result in channel assignments as shown in FIG. 5 for a memory access. Any of the total information units of the intermediate information map M1 table 515 may be accessed via parallel memory accesses. That is, the information units for a total information unit are in different channels. For example, information unit "B" is in channel CH2 and information unit "b" is in CH1. Likewise, none of the other information units "A" and "C" through "H" are in the same channel as the counterpart information unit of the total information unit, that is, information units "a" and "c" through "h," respectively. Similar to the desired information map after scrubbing M2 table 420 of FIG. 4, the parallel information mapping of the intermediate information map M1 table 515 may take less time to retrieve a total information unit than the sequential information mapping depicted in the initial information map M0 table 410.

In some embodiments, addresses corresponding to the intermediate information map M1 table 515 may be invisible to the guest operating systems and may be managed by a memory translation unit (MTU), such as the MTU 240 of FIG. 2. Thus, translating a logical address corresponding to information in an intermediate information map state may require an additional level of hardware translation. The additional level of hardware translation may increase latency in a memory access operation. Therefore, in order for the computing system to make memory regions mapped using the intermediate information map M1 table 515 visible to software, and eliminate the additional level of hardware translation, migration scrubbing operation may be performed to transition from the intermediate information map M1 table 515 to the desired information map table 420 of FIG. 4. Thus, FIG. 6 depicts completing a migration by performing the scrubbing operation to transition from an intermediate information map M1 table 515 having the X byte depth to a desired information map after scrubbing M2 table 620, representing the desired information mapping of information. FIG. 6 includes elements that have been previously described with respect to the FIGS. 4 and 5. Those elements have been shown in FIG. 6 using the same reference numbers and labels as in FIGS. 4 and 5, and the common elements are as previously described. Consequently, a detailed description of these elements will not be repeated in the interest of brevity.

As explained, the initial information map M0 table 410 may correspond to the initial information map M0 table 410 of FIG. 4 having the 2X byte depth sequential information mapping. Further, the intermediate information map M1 table 515 may correspond to the intermediate information map M1 table 515 of FIG. 5 having the X byte depth parallel information mapping. The desired information map after scrubbing M2 table 620 may correspond to the desired information map after scrubbing M2 table 420 of FIG. 4

In operation, a memory management processor (MMP) (e.g., the MMP 260 of FIG. 2) or a memory translation unit (MTU) (e.g., the MTU 240 of FIG. 2) may manage an initial migration from the initial information map M0 table 410 to the intermediate information map M1 table 515 due to time and/or power constraints. For example, as explained with reference to FIG. 5, the initial migration requires eight block moves. Responsive to an event, the MMP or MTU may complete a migration from the intermediate information map M1 table 515 to the desired information map after scrubbing M2 table 620. The circled information units (e.g., "A", "E", "a", "B", "C", "D", and "h") may not require a move during the migration from the intermediate information map M1 table 515 to the desired information map after scrubbing M2 table 620, and thus, the migration includes nine remaining block moves. Examples of events that may prompt the MTU to initiate the migration from the intermediate information map M1 table 515 to the desired information map after scrubbing M2 table 620 include idle memory, computing system switched to a performance mode (e.g., no longer in a power conservation mode), currently running a scrubbing operation on the affected memory device regions, etc. While the migration depicted in FIG. 6 requires more total block moves, (e.g., 8+9=17 versus 16 (or 14)), initially moving to the intermediate information map M1 table 515 may allow the computing system to efficiently perform an initial migration that provides benefits of the desired information map after scrubbing M2 table 620, and provides an ability to schedule a remaining scrubbing operation at a time that may limit a negative impact on the computing system.

It will be appreciated that the transition from the sequential information map to the parallel information map described in FIGS. 4-6 may also apply to a transition from the parallel information map to the sequential information map. That is, a parallel information map (e.g., M2 table 620) may migrate to an intermediate information map (e.g., M1 table 515), and then a scrubbing operation may be performed to transition from the intermediate information map to a sequential information map (e.g., M0 table 410) when the channel depth is made deeper (e.g., from an X byte depth to a 2X byte depth).

While FIGS. 4-6 depict a total data unit having only two individual data units, it will be appreciated that a total data unit may have any number of individual data units. Further, while FIGS. 4-6 depict the sequential data map (e.g., M0 table 410) having a depth of 2X, it will be appreciated that a sequential data map may be any number of data units deep. While FIGS. 4-6 depict the sequential data map (e.g., M0 table 410) and the parallel data maps (e.g., M1 table 515 and/or M2 tables 420/620) individually, it will be appreciated that a mapping scheme may include a combination of a parallel data map and a sequential data map. For example, in the example of FIGS. 4-6, if a total data unit included four individual data units, the four data units could be divided across two channels, with each channel having a depth of two data units.

Figure 7:
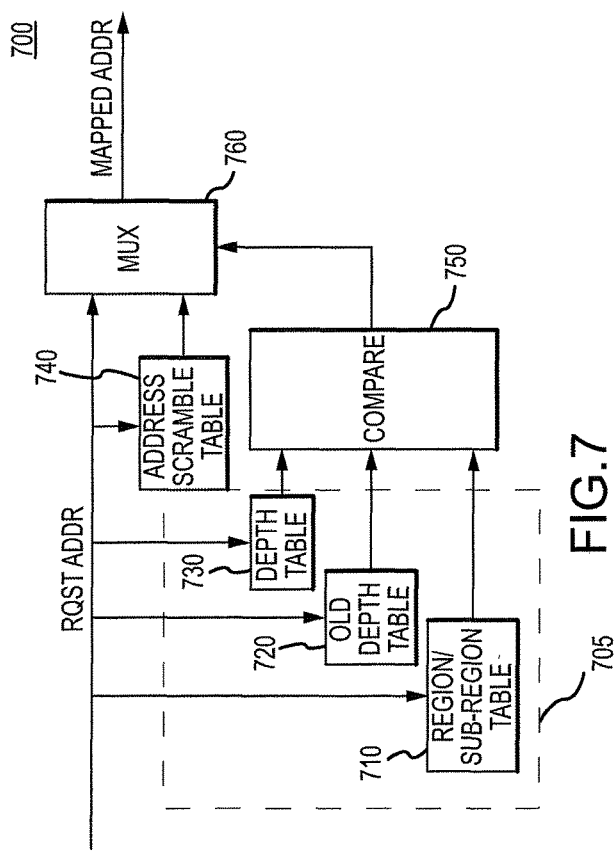
FIG. 7 is a block diagram of a memory translation unit according to an embodiment of the disclosure.
Figure 8:
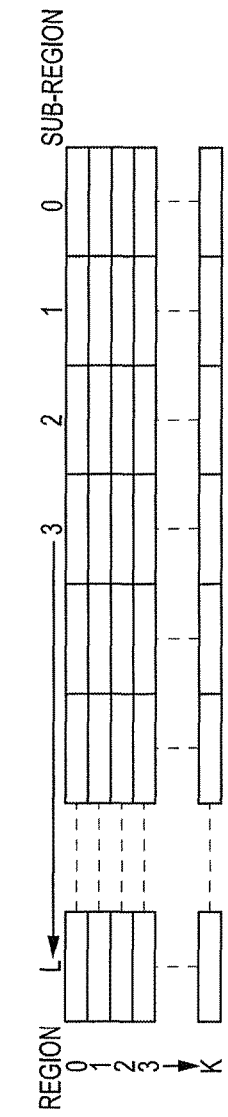
FIG. 8 is a block diagram of a region/sub-regions allocation of a memory according to an embodiment of the disclosure.
Figure 9:
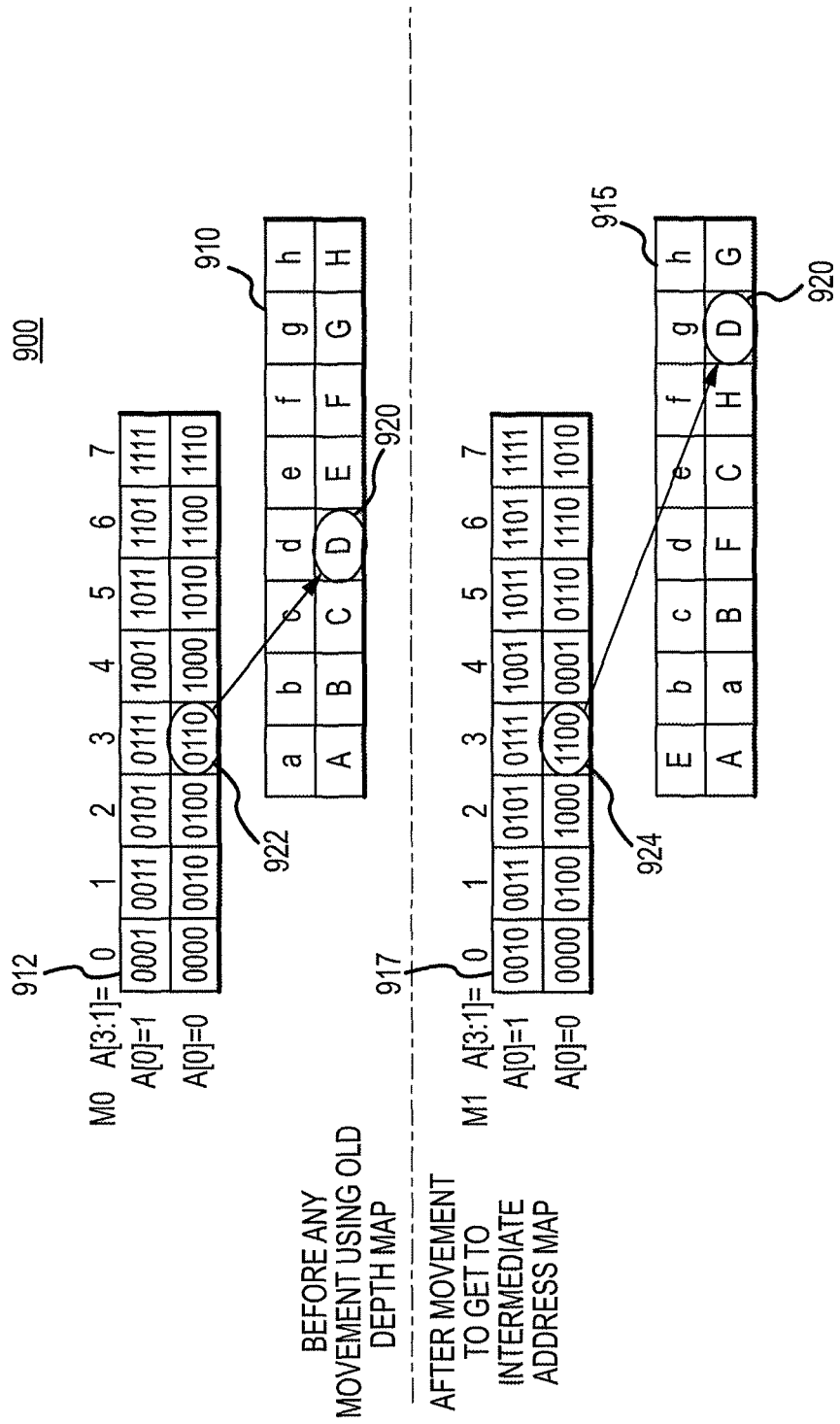
FIG. 9 is an exemplary block diagram of intermediate information depth map access according to an embodiment of the disclosure.

As explained with reference to FIGS. 4-6, the intermediate information map may be invisible to software and may require an additional hardware translation. FIGS. 7-9 illustrate accessing information mapped according to an intermediate information map and/or accessing information currently in a migration operation. FIG. 7 illustrates a block diagram of a memory translation unit including mapping tables according to an embodiment of the disclosure. The memory translation unit MTU 700 may include a multiplexer 760 configured to provide one of a requested address RQST ADDR and an address from an address scramble table 740 as a mapped address output MAPPED ADDR based on a value of a control signal from a comparator 750. The value of the control signal from the comparator 750 may be based on information received from mapping tables 705. The mapping tables 705 may include a region/sub-region table 710, an old depth table 720, and a depth table 730. The MTU 700 may correspond to the MTU 240 of FIG. 1.

For illustration, FIG. 8 depicts a memory map of a memory divided into regions and sub regions. Each row of the table depicted in the table 800 corresponds to a different region (e.g., region 0, 1, 2, 3, . . . , K). Further, each region of the memory is further divided into sub-regions represented by the column headings (e.g., 0, 1, 2, 3, . . . , L) of the table 800.

In operation, when new transactions enter a memory controller (e.g., the memory controller 226 of FIG. 2), the RQST ADDR is used to identify a region of the memory map the transaction targets, as in FIG. 8. Responsive to identification of a region, a respective old depth parameter associated with the identified region is retrieved from the old depth table 720 and a respective depth parameter associated with the identified region is retrieved from the depth table 730. The old depth parameter and the depth parameter are compared at the comparator 750. Responsive to the old depth parameter matching the depth parameter, the comparator 750 provides a control signal having a first value to the multiplexer 760. Responsive to receiving the control signal having the first value, the multiplexer 760 provides the RQST ADDR at the output as the MAPPED ADDR to decoding logic, such as a TLB.

Responsive to the old depth parameter not matching the depth parameter, a state of the address map and a state of the region/sub-region is retrieved from the region/sub-region table 710. A size of the region/sub-region table 710 may be based on the size of the "Depth Region" set by the operating system. For example, if an entire "Depth Region" is migrated together in one pass, the "Depth Region" is considered a region. Alternatively, if the "Depth Region" is large, the operating system may divide the "Depth Region" into sub-regions. The states of the address map in the region/sub-region table 710 may include old depth map (M0), intermediate information depth map (M1), or new depth map (M2). The states of the region/sub-region of the region/sub-region table 710 may include: (1) move in progress, (2) move not in progress, (3) an intermediate state, and (4) move complete, e.g., new depth map (M2).

When a depth mapping change occurs, a region/sub-region state is set to the 'move in progress' state responsive to a memory controller (e.g., the memory controller 226 of FIG. 2) being instructed to move the information in the region/sub-region. Based on the region/sub-region state being set to the 'move in progress' state, the memory controller may perform one of stalling transactions that target the respective region/sub-region or completing transactions for information currently in the memory controller queues. When the information has not begun to be moved, the region/sub-region state is set to the 'move not in progress' state, and the comparator 750 is configured to provide the control signal to the multiplexer 760 having the first value. Based on the control signal having the first value, the multiplexer 760 provides the RQST ADDR at an output as the MAPPED ADDR, and the MAPPED ADDR is decoded based on the old depth map.

When movement of the information has begun, the region/sub-region state is set to the 'intermediate state' state. When the region/sub-region state is set to the 'intermediate state' state, the comparator 750 may be configured to provide the control signal to the multiplexer 760 having a second value. Based on the control signal having the second value, the multiplexer 760 is configured to provide an output from the address scramble table 740 as the MAPPED ADDR to decoding logic. The address scramble table 740 is configured to provide a translation (e.g., scramble) of the RQST ADDR to allow the decoder to access a current location of targeted information. The MAPPED ADDR based on the output of the address scramble table 740 may be decoded by the decoding logic to determine the location of the targeted information. When the information has been completely moved, the region/sub-region state is set to the 'completely moved' state, and the comparator 750 is configured to provide the control signal to the multiplexer 760 having the first value. Based on the control signal having the first value, the multiplexer 760 is configured to provide the RQST ADDR at an output, and the RQST ADDR is decoded based on the (new) depth map. The operating system (e.g., the MMH operating system as described with reference to FIGS. 2 and 3) and/or a memory translation unit (MTU) (e.g., the MTU 240 of FIG. 2) may control whether the region/sub-region state should be set to the 'intermediate state' state or the 'move complete' state (M2 ).

FIG. 9 depicts an example of address translation based on an initial depth map and an intermediate information depth map according to embodiments of this disclosure. Old depth map M0 table 912 represents a mapping of information of an old depth map before any information has moved. Old information map table 910 represents where information units are stored in memory based on the old depth map. Intermediate depth map M1 table 917 represents a mapping of information of based on an intermediate information depth map (e.g., after some information has moved). Intermediate information map table 915 represents where information items are stored in memory based of the intermediate information depth map. The initial information map table 910 may correspond to the initial information map M0 table 410 of FIGS. 4-6. The intermediate information map table 915 may correspond to the intermediate information map M1 table 515 of FIGS. 5-6.

In an example operation, while information is mapped according to an old depth map, a request for information "D" 920 at a request address 4'b0110 is received at an MTU. Based on the MTU determining that the old information map table 910 applies (e.g., via logic depicted in FIG. 7), the MTU may consult the old depth map M0 table 912 to translate the address 4'b0110 922. Based on the old depth map M0 table 912, the MTU may provide an address 4'b0110 922 that points to a location of the information "D" 920 in the old information map table 910.

Further, while information is mapped according to an intermediate information depth map, a request for information "D" 920 at a request address 4'b0110 is received at an MTU. Based on the MTU determining that the intermediate information map table 915 applies, the MTU may consult the intermediate information depth map M1 table 917 to translate the address 4'b0110. Based on the intermediate information depth map M1 table 917, the MTU may provide an address 4'b1100 924 that points to a location of the information "D" 920 in the intermediate information map table 915.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:
1. An apparatus, comprising:
a processing unit configured to run an operating system, wherein the operating system is a memory management hypervisor (MATH) operating system, wherein the MMH operating system provides memory management threads (MMT) configured to manage the memory, wherein the MMH operating system is configured to support a guest operating system run on the processing unit;

a memory coupled to the processing unit, the memory configured to communicate with the processing unit via a memory bus, wherein the memory includes a first memory controller configured to access at least one of a volatile memory or a non-volatile memory; and an adaptive memory controller configured to receive monitored statistical data from the first memory controller and from the processing unit, wherein the adaptive memory controller is configured to manage the memory based on the monitored statistical data, wherein the adaptive memory controller comprises a memory management processor (MMP) configured to run the MMT, wherein the MMP running the MMT is configured to manage the memory based on the monitored statistical data, wherein the MMP is configured to at least one of:

change a frequency of a portion of the at least one of the non-volatile memory or the volatile memory;

change a refresh period of a portion of the volatile memory;

perform a memory scrub of a portion of the at least one of the non-volatile memory or the volatile memory; or change a multi-level cell mode of a portion of the at least one of the non-volatile memory or the volatile memory.

2. The apparatus of claim 1, wherein the MMP comprises a cache and a direct-memory access (DMA) engine, Wherein the DMA engine is configured communicate with the memory.

3. The apparatus of claim 2, wherein the processing unit includes a cache and the cache of the MMP is coupled to the cache of the processing unit via a common bus.

4. The apparatus of claim 1, wherein the processing unit is configured to execute the MMH operating system using a first instruction set, and wherein the MMP is configured to execute the MMH operating system using a second instruction set.

5. The apparatus of claim 1, wherein the memory comprises both a non-volatile memory and a volatile memory.

6. The apparatus of claim 5, wherein the at least one of the non-volatile memory or the volatile memory is a multi-channel memory.

7. The apparatus of claim 5, wherein the MMP running the MMT being further configured to change address mapping of a portion of the at least one of the non-volatile memory or the volatile memory.

8. The apparatus of claim 1, wherein the MMP running the MMT being configured to manage the memory comprises the MMP running the MMT being configured to manage migration of information in the memory.

9. The apparatus of claim 8, wherein the MMP running the MMT being configured to manage migration of information comprises the MMP running the MMT being configured to provide memory commands to a memory controller instructing the memory controller to move blocks of information in the memory.

10. The apparatus of claim 1, wherein the MMP is configured to am the MMT to determine when to reconfigure the memory based on the monitored statistical data.

11. The apparatus of claim 1, wherein the MMP is configured to nm the MMT to determine how to reconfigure the memory based on monitored statistical data.

12. The apparatus of claim 1, wherein the MMP is configured to run the MMT to map information using an intermediate information depth map.

13. The apparatus of claim 1, wherein the adaptive memory controller further comprises a performance management unit (PMU) configured to monitor the monitored statistical data, the PMU further comprising a PMU interface configured to couple the PMU to the processing unit and the MMP via a common bus and to a memory controller of the memory.

14. The apparatus of claim 13, wherein the PMU interface is configured to couple the PMU to the memory controller via at least one of the memory bus or a direct connection.

15. The apparatus of claim 1, wherein the adaptive memory controller configured to manage the memory based on the monitored statistical data comprises the adaptive memory controller configured to manage information depth and location based on traffic between the processing unit and the memory 220.

16. The apparatus of claim 1, wherein the adaptive memory controller configured to manage the memory based on the monitored statistical data comprises the adaptive memory controller configured to perform dynamic reconfiguration of the memory to match an information mapping with changing memory patterns of threads running on the processing unit.

17. A method, comprising:

retrieving, using a memory controller of a memory, information in at one of a non-volatile or volatile memory of the memory responsive to memory access requests received at the memory controller from a processing unit running a memory management hypervisor (MMH) operating system; and managing a configuration of the memory at a memory management processor (MMP) running memory management threads (MMT) of the MMH operating system based on monitored statistical data, including:

changing a multi-level cell mode of a portion of memory;

managing mingration of information in the memory including managing metadata of page tables and translation lookaside buffers; and responsive to receiving a memory access request for information stored in a portion of the memory undergoing a migration;

generating a page fault in the MMH operating system while the requested information is unavailable; and providing the information when the portion of the memory become available.

18. The method of claim 17, further comprising receiving the monitored statistical data associated with the memory and the processing unit.

19. The method of claim 17, wherein the monitored statistical data associated with the memory comprises at least one of depth map setting of information stored at the memory, information mapping of and between portions of the memory, frequency of accesses of portions of the memory, or any combination thereof.

20. The method of claim 17, wherein the monitored statistical data associated with the processing unit comprises at least one of types of the memory access requests, frequency of the memory accesses, idle time of the processing unit, or any combination thereof.

21. The method of claim 17, wherein managing migration of information in the memory comprises:

providing memory commands to the memory; and moving blocks of information in the memory responsive to the memory commands.

22. The method of claim 17, wherein managing metadata of page tables and translation lookaside buffers further comprises storing the metadata in shadow page tables and translation lookaside buffers that are not visible to a guest operating system.

23. The method of claim 17, wherein managing the configuration of the memory at the MMP running the MMH hypervisor operating system based on monitored statistical data associated with the memory and the processing unit comprises moving a portion of the memory from a first information depth map to an intermediate information depth map, wherein the intermediate information depth map is invisible to a processing unit running a guest operating system.

24. The method of claim 17, wherein responsive to receipt of a memory access request to the portion of memory mapped according to an intermediate information depth map from the processing unit:
performing an initial translation of a logical address of the memory access request at a memory translation unit to produce a translated address; and
translating the translated address into a physical address of the memory.

25. The method of claim 17, wherein managing the configuration of the memory at the MMP running the MMH hypervisor operating system based on monitored statistical data associated with the memory and the processing unit further comprises at least one of changing address mapping of a portion of the memory or changing a frequency of a portion of the memory.

26. The method of claim 17, wherein the memory at a memory management processor (MMP) running memory management threads (MMT) of the MMH operating system based on monitored statistical data, further including changing a refresh period of a portion of the memory.

27. A method comprising:
retrieving, using a memory controller of a memory, information in at one of a non-volatile or volatile memory of the memory responsive to memory access requests received at the memory controller from a processing unit running a memory management hypervisor (MMH) operating system; and
managing a configuration of the memory at a memory management processor (MMP) running memory management threats (MMT) of the MMH operating system based on monitored statistical data, wherein managing migration of information in the memory further comprises;
changing a multi-level cell mode of a portion of memory;
managing mingration of information in the memory including managing metadata of page tables and translation lookaside buffers; and
responsive to receiving a memory access request for information stored in a portion of the memory undergoing a migration:
stalling a thread making the request in the MMH operating system while the requested information is unavailable; and
providing a translation of a logical address of the memory access request associated with a new address of the memory where the information is stored responsive to completion of movement of the information.

* * * * *